United States Patent [19]

Ahmed

[11] Patent Number: 4,848,510
[45] Date of Patent: Jul. 18, 1989

[54] SNOW AND ICE MELTING SYSTEM FOR AUTOMOTIVE VEHICLES

[76] Inventor: Mohamed I. Ahmed, 50, Avenue Foch, Paris, France, 75116

[21] Appl. No.: 172,416

[22] Filed: Mar. 23, 1988

[51] Int. Cl.⁴ .............................................. B60B 39/00
[52] U.S. Cl. .......................................... 180/309; 291/3
[58] Field of Search .................. 180/89.2, 309; 291/1, 291/3, 23; 126/271.1

[56] References Cited

U.S. PATENT DOCUMENTS

| | | | |
|---|---|---|---|
| 2,515,341 | 7/1950 | Giguere | 126/271.1 |
| 2,999,711 | 9/1961 | Sturmer | 291/3 |
| 3,232,287 | 2/1966 | Gillingham et al. | 126/271.1 |
| 3,289,668 | 12/1966 | Drucker | 126/271.1 |
| 4,063,606 | 12/1977 | Makinson | 180/1 R |
| 4,203,423 | 5/1980 | Ricci | 291/3 |
| 4,316,625 | 2/1982 | Goon et al. | 291/1 |
| 4,324,307 | 4/1982 | Schittino et al. | 126/271.1 |

FOREIGN PATENT DOCUMENTS

| | | | |
|---|---|---|---|
| 509718 | 3/1952 | Belgium | 180/309 |
| 1468222 | 12/1966 | France | 180/309 |
| 525931 | 5/1955 | Italy | 180/309 |
| 20297 | of 1903 | United Kingdom | 180/309 |
| 870112 | 6/1961 | United Kingdom | 180/309 |

Primary Examiner—Charles A. Marmor
Assistant Examiner—Ross Weaver
Attorney, Agent, or Firm—Dowell & Dowell

[57] ABSTRACT

A system for utilizing the waste heat from the exhaust systems of automotive vehicles to provide for increased traction of the drive wheels of such vehicles wherein the exhaust gases and/or air passing in heat exchange relationship with the exhaust gases pass through a blower unit and through conduits which direct the heated gases to areas proximate to the vehicle drive wheels.

8 Claims, 2 Drawing Sheets

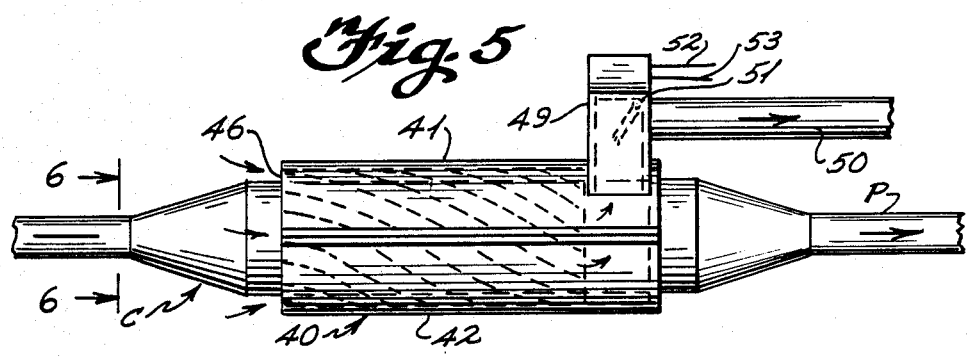
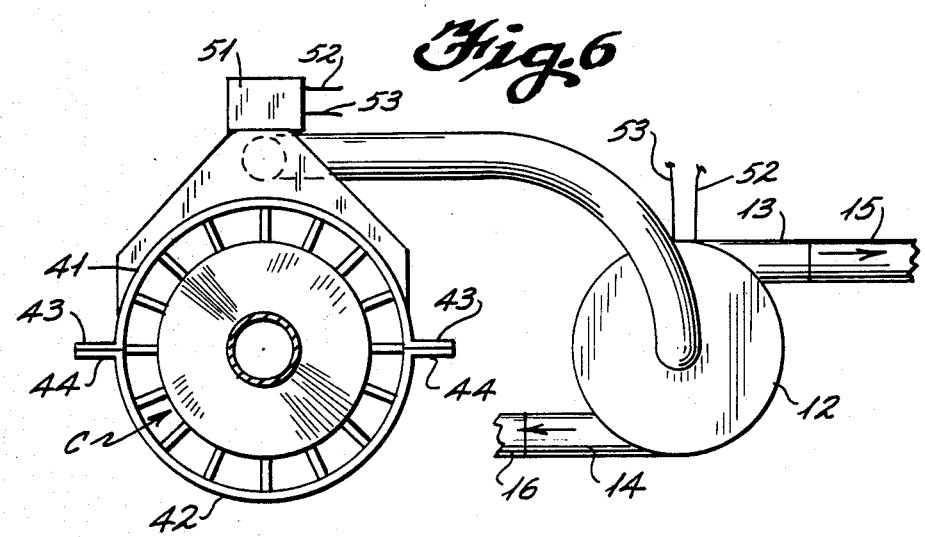
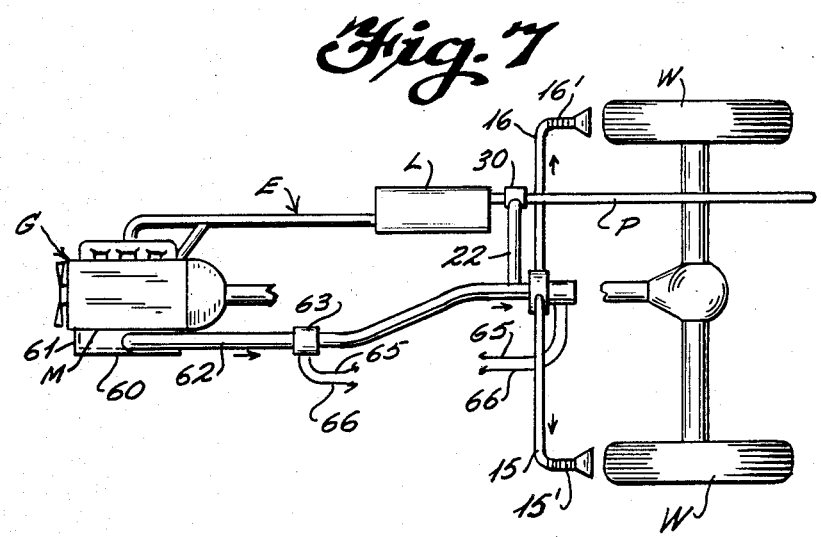

SNOW AND ICE MELTING SYSTEM FOR AUTOMOTIVE VEHICLES

BACKGROUND OF THE INVENTION

1. Field of the Invention

This invention is generally directed to traction systems for automotive vehicles and more specifically to systems for utilizing the exhaust gases from an automotive vehicle engine and/or air heated by passing in heat exchange relationship with the automotive exhaust system to melt ice or snow immediately in front of the vehicle drive wheels so that the drive wheels are able to maintain better traction with a traveled surface. The traction increasing systems of the present invention are designed to provide a positive flow of heated gas or air to the area adjacent the front of the drive wheels regardless of the operating speed of the vehicle engine. In addition, the systems of the present invention not only utilize the exhaust gases directly but may also be utilized to selectively heat air which passes in heat exchange relationship with the vehicle engine, the catalytic converter or the pipes of the vehicle exhaust system. In each case, a blower unit is provided to supply a positive flow of heated air to the area adjacent the drive wheels so that ice or snow which is built up in front of the drive wheels will be melted thereby enabling the drive wheels to obtain better traction with the traveled surface. The systems of the invention are further designed to be quickly installed to existing automotive exhaust systems without interfering with the operation of the exhaust systems and without adversely effecting the operation of the vehicle engine. Further, in at least one of the embodiments of the present invention, air is passed in heat exchange relationship with the catalytic converter associated with the vehicle exhaust system and thereby enables the catalytic converter to be substantially cooled thereby prolonging the effective life of the converter and at the same time preventing undesirable heat buildup under the vehicle passenger compartment.

2. History of the Related Art

Many motorists have experienced the frustrations which are encountered when operating their motor vehicles during inclement weather conditions. All to often, snow and ice accumulate on driveways, parking lots and roadways making vehicle operation not only difficult but hazardous. When such adverse conditions are anticipated, many motorists prepare their vehicles for safer operation by mounting snow tires and/or chains. However, even these preparations are not always effective.

In addition to the foregoing, many of today's automotive vehicles are equipped with what are termed "all weather tires" which are specifically designed to enable vehicle operation under both good and bad weather conditions. Such all weather tires do away with the additional expense of separate tires and/or chains and also free motorists from having to install separate tires or chains in anticipation of adverse weather. Again, however, even the best all weather tires are not always effective and this is true under conditions of minor snow accumulations.

In those instances where the drive wheels of a vehicle lose momentum with respect to a snow or ice covered traveled surface, the tires are generally ineffective to overcome the buildup of an ice or snow block which accumulates in front of the drive wheels during such slippage. The loss of vehicle momentum results in the weight of the vehicle being ineffective to overcome even a small buildup of ice or snow in front of the drive wheels. Under these conditions, the wheels will simply spin relative to the traveled surface and as they continue this motion will add to the buildup of icy material in the area forward of the tires as snow and ice is melted and refrozen.

The foregoing problems associated with the loss of momentum in operating motor vehicles is not peculiar to smaller vehicles such as automobiles. Even large trucks which are generally designed to operate under adverse weather conditions will encounter areas in which the loss of vehicle momentum results in the drive wheels of the trucks losing traction and being inefficient in establishing forward or rearward motion of the vehicle relative to a snow or ice covered surface. This requires the operator of the vehicle to dismount the vehicle and clear the ice and snow from in front of the drive wheels or perhaps provide abrasives in front of the drive wheels in order to permit the vehicle to again reestablish some type of forward or reverse momentum which will enable the drive wheels to have effective drive traction relative to the slippery traveled surface.

In addition to the foregoing, even in those instances where vehicle operators are able to overcome a free wheeling condition relative to a slippery surface such as by rocking a vehicle back and forth relative to the surface, the wear and tear on the engine and clutch components of the vehicle becomes significant and possible damage may be caused to the vehicle drive train, clutch or the tires themselves. Further, even on minor inclines where it would appear that vehicle momentum may be achieved such as by having individuals aid in pushing a vehicle relative to the surface, the safety hazards associated with such maneuvers are often significant. When the drive wheels of an automotive vehicle are free wheeling relative to a slippery surface, the entire vehicle may be shifted easily from side to side as the wheels spin through snow or along an icy surface. If the vehicle accidentally begins to spin or move in what is termed a fish-tailing type manner, any persons attempting to push the vehicle are subjected to being hit by the vehicle as it swings relative to its elongated axis. An additional hazard is encountered where the vehicle drive wheels are free wheeling and often kick up small chunks of ice and gravel which are thrown to the rear of the vehicle and which may hit bystanders causing severe injury.

In view of the foregoing, there have been efforts made to provide some type of assistance for enabling initial traction to be established between vehicle drive wheels and a snow or ice covered surface. In many of these developments, use has been made of the exhaust gases developed by the engine of the automotive vehicle in an attempt to direct such gases to melt ice or snow in the area of the vehicle drive wheels.

In U.S. Pat. No. 2,515,341 to Giguere, a deicing attachment for motor vehicles is disclosed which incorporates a hand-directed nozzle element which is connected by a tube to the tailpipe of the automotive exhaust system. The flexible tube or conduit connecting the nozzle to the exhaust system allows the nozzle to be oriented so as to direct exhaust gases in the area adjacent a vehicle tire. Unfortunately, with this type of system, the operator of the vehicle must dismount the vehicle and manually maneuver the deicing nozzle so as to direct the gases relative to the vehicle tires. This, of course, is not an effective means for operating the vehicle as the operator must mount and dismount the vehicle every time any type of wheel slippage is encountered. This means that the momentum of the vehicle will never be established so long as there is any wheel slippage relative to an ice or snow covered surface. Further, with this type of structure, the operator of the vehicle must be in the area of the exhaust fumes which is not safe nor healthy.

Improvements on the foregoing system have been suggested over the years. In U.S. Pat. No. 3,232,287 to Gillingham et al., an automobile defreezing unit is disclosed wherein a control valve is mounted rearwardly of the exhaust manifold coming from the engine and in which exhaust gases may be regulated towards the rear wheels of the vehicle upon the vehicle operator operating one or two valves which are controlled by cables extending to the dashboard of the vehicle. However, as with the case with the structure in the patent to Giguere, the Gillingham et al. system is designed to be manually operated with the nozzle being directed to components such as the brake drums or wheels through an elongated flexible conduit. Therefore, with this type of system, the aforementioned problems of loss of vehicle momentum and of operator contact directly with the exhaust gases remain a significant problem which make the system ineffective for actual use.

In U.S. Pat. No. 4,203,423 to Ricci, a vehicle safety system is disclosed wherein a plurality of flexible hose elements extend from a special gas distributor which is mounted in the exhaust line between the muffler and the tailpipe of an automotive vehicle. The exhaust distributor is controlled by a valve operated by the vehicle operator from the interior of the vehicle. This type of system does away with the necessity for the operator having to mount and dismount the vehicle and thereby enables the momentum of the vehicle to be continually established up slight grades when exhaust gases are being directed toward the vehicle drive wheels Unfortunately, this type of system relies totally on the flow of exhaust gases from the engine and therefore at low engine RPM's, the amount of gas which is available to actually be directed through four conduits is somewhat insignificant and therefore often not effective. In establishing vehicle momentum on slippery surfaces, the engine RPM's must be maintained as close to a minimum as possible so as not to overdrive the wheels and cause spinning of the wheels relative to the slippery surface. However, under such engine operation conditions, only a minimum flow of exhaust gases is achievable and therefore only a minimum amount of hot air or gas is available to be utilized to melt ice or snow in the area of the vehicles. A similar system is disclosed in U.S. Pat. No. 4,324,307 to Schittino et al. In this system, the conduits directed to the vehicle drive wheels are continuously exposed to vehicle exhaust gases. This situation cannot be tolerated as there are many instances in which it would not be desired to direct exhaust gases relative to the vehicle drive wheels. Further, it is contemplated that the use of such exhaust gases in a continuously inline system would present a safety hazard which would not be acceptable to the automotive industry.

In an effort to increase the traction developed between vehicle wheels and a slippery road surface, other systems have been proposed for providing abrasives to the area adjacent of the vehicle wheels. Further, in some of these systems, air or gases are utilized from the vehicle exhaust system to propel the abrasives relative to the drive wheels.

In U.S. Pat. No. 3,289,668 to Drucker, a snow and ice melting traction device for vehicles is disclosed having a sand distributor which is mounted adjacent to a discharge nozzle that is supplied with gases from the vehicle exhaust system. However, this type of system suffers from the same disadvantages as the system discussed above with respect to the patent to Ricci. Specifically, the amount of gas flow which is achievable is dependent upon the amount of exhaust gases being discharged from the engine. Therefore, when the engine is at low RPM as is necessary when establishing traction, a minor amount of exhaust gases are developed and therefore only a minor amount of hot gas is available at the area of the drive wheels.

In U.S. Pat. No. 2,999,711 to Sturmer, an anti-skid sanding device is disclosed wherein a separate blower unit is utilized to discharge sand forwardly or on top of the vehicle drive wheels in order to provide traction elements which can be utilized by the drive wheels when traveling over ice or snow. There is no attempt with such systems, however, to provide any apparatus for melting any ice or snow relative to the drive wheels. Further, the use of such abrasives requires a supply of abrasives to be maintained in the vehicle which is not always possible especially if the system has been utilized frequently over a short period of time. A similar type of system is disclosed in U.S. Pat. No. 4,316,625 to Goon et al. In this system, a separate blower is also utilized to discharge sand forwardly of the drive wheels of the vehicle. Again, this requires that a supply of abrasive materials be carried in the vehicle at all times or readily available to load in the vehicle at all times.

A further example of vehicle traction device for automotive vehicles is disclosed in U.S. Pat. No. 4,063,606 to Makinson. In this patent, an anti-hydroplaning device is disclosed wherein a pump supplies high pressure air forwardly of the vehicle steering wheels so as to prevent hydroplaning of the wheels relative to a wet traveled surface.

SUMMARY OF THE INVENTION

This invention is directed to systems for providing continuous currents of hot gases to the area in front of the drive wheels of automotive vehicles for melting minor amounts of ice and snow which are built up in front of the drive wheels so as to enable a vehicle to establish initial traction and momentum with respect to an ice or snow covered surface. The invention is directed more specifically to a system for providing a positive flow of exhaust gases and heated air which is brought into heat exchange relationship with the exhaust system of a vehicle so as to provide sufficient hot gases to accomplish a melting of ice and snow which will enable vehicle traction to be established. In each embodiment of the invention, a blower unit is mounted so as to communicate with the exhaust pipe of an automotive vehicle and which blower unit is controlled by the operator of the vehicle from within the vehicle compartment. The blower may be selectively operated with appropriate valves being provided to discharge or direct exhaust gases through a blower toward the drive wheels of the automotive vehicle.

In another embodiment of the invention, supplemental hot gases are provided by drawing air into heat exchange relationship with the exhaust manifold of the automotive engine and/or in heat exchange relationship with respect to a catalytic converter which is conventionally utilized on most new car exhaust systems. In these supplemental structures, the air which is heated as it passes in heat exchange relationship with the manifold or catalytic converter is directed through the blower toward the automotive drive wheels. These systems may be used in combination with one another so that both heated air and the exhaust gases may be directed toward the vehicle drive wheels or one or the other of the exhaust gases or the heated air may be directed toward the vehicle drive wheels as deemed necessary by the operator of the automotive vehicle.

The system of the present invention also includes a control valve which may be mounted in line with the conventional exhaust system so that during normal operation of the automotive vehicle, exhaust gases are discharged through the tailpipe as is conventional. In this respect, the control valve may be operated by the vehicle operator in times of emergencies so as to redirect exhaust gases to the vehicle drive wheels.

It is a primary object of the present invention to provide a heat source for melting small amounts of ice and snow in front of the drive wheels of an automotive vehicle so that the drive wheels may effectively create a forward momentum of the vehicle relative to a traveled surface and wherein the heat source is constantly available through the exhaust gases of the automotive vehicle and/or heated air which passes in heat exchange relationship with respect to the exhaust manifold or catalytic converter of the vehicle.

It is yet another object of the present invention to provide a source of hot gases to melt snow and ice accumulated in front of the drive wheels of an automotive vehicle and wherein the amount of gas which is discharged is not dependent upon the operating speed of the automotive engine but is supplied by a separate blower unit which insures an appropriate volume of gas discharge to provide adequate melting of ice and snow relative to the vehicle drive wheels.

It is also an object of the present invention to provide a system for melting snow and ice adjacent to the drive wheels of a vehicle wherein the operator of the vehicle need not leave the passenger compartment of the vehicle in order to effect the operation of the overall system so that the operator is not directly exposed to exhaust gases which may be utilized for melting ice and snow and wherein the operator does not have to discontinue the forward momentum of the vehicle in order to effect operation of the ice and snow melting system.

It is yet another object of the present invention to provide a system for melting ice and snow adjacent to the drive wheels of an automotive vehicle wherein exhaust gases may be selectively utilized during emergency situations and redirected toward the vehicle wheels but which exhaust gases under normal operating conditions are allowed to pass through the tailpipe of the exhaust gas system in a conventional manner.

It is another object of the present invention to provide a system for melting ice and snow which have accumulated forwardly of a vehicle's drive wheels and wherein air is brought into heat exchange relationship with the vehicle exhaust manifold and/or catalytic converter so that fresh air may be heated by the exhaust system and either used alone or in combination with the exhaust gases to provide a sufficient heat source for accomplishing the necessary melting of ice and snow.

A further object of the present invention is to provide a system which is safer than conventional ice and snow melting systems and one in which the operator is not exposed to exhaust gases and in some instances where exhaust gases need not be utilized at all to effectively provide a source of hot air supply for melting ice and snow in order to create sufficient traction to operate a motor vehicle.

BRIEF DESCRIPTION OF THE DRAWINGS

FIG. 5 is a view of an indirect heat exchanger provided around the catalytic converter of an automotive vehicle which may be utilized to heat ambient air and direct it to the blower unit of the present invention in order to provide a supplemental heat source for melting ice and snow.

FIG. 6 is an enlarged cross sectional view taken along lines 6—6 of FIG. 5.

FIG. 7 is a top plan view of another embodiment of the present invention wherein atmospheric air may be directed through a heat exchanger mounted to the exhaust manifold or block of an automotive engine so as to provide a source of hot air which is directed to the blower unit of the present invention and wherein indirectly heated gas may be combined with gas from the exhaust system in order to provide a source of hot air and gases to melt snow and ice forwardly of the drive wheels of a vehicle.

DESCRIPTION OF THE PREFERRED EMBODIMENT

Figure 1:
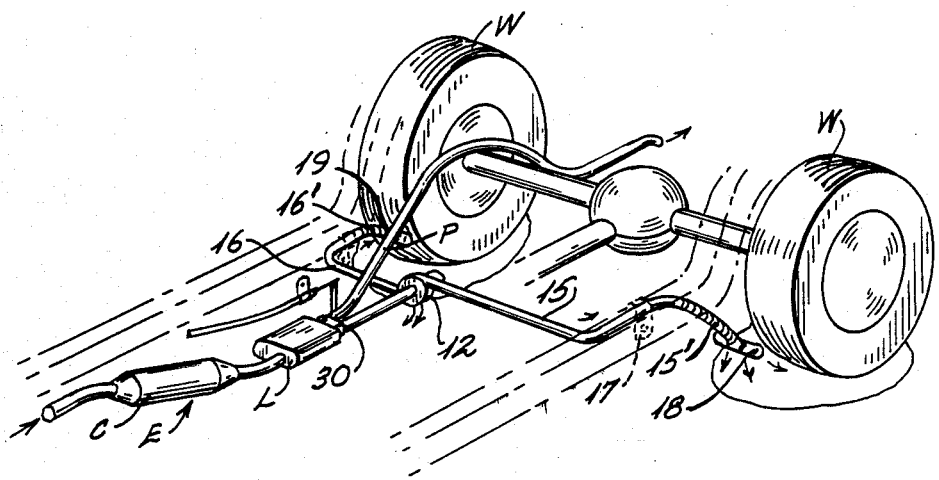
FIG. 1 is a partial illustrational view of one embodiment of the present invention as shown mounted relative to the drive wheels of an automotive vehicle and in relation to the exhaust system of the vehicle.

With continued reference to the drawings, the snow and ice melting systems of the present invention will be described as they are utilized with a conventional automotive vehicle. As shown in FIG. 1, these systems are designed to be mounted so that they will provide for melting of ice and snow relative to the drive wheels W of an automotive vehicle and in this respect although the drawings only reflect two drive wheels, it should be noted that the systems of the present invention may be utilized either with rear wheel drive, front wheel drive or with four wheel drive vehicles. Therefore, in considering the description below, it should be remembered that the system is adaptable for both two wheel and four wheel drives. In addition, the ice and snow melting systems of the present invention are specifically designed to be utilized with conventional exhaust systems E. Such systems are provided to discharge exhaust gases from an exhaust manifold M mounted to the vehicle engine G to the tailpipe T. The exhaust systems generally include exhaust pipes P which interconnect a catalytic converter C and a muffler L in line with the tailpipe T.

The snow and ice melting systems of the present invention each include a blower unit 12 having discharge outlets 13 and 14 which are connected to elongated conduits 15 and 16 which extend outwardly from the blower and which are attached to the frame F of the vehicle by brackets 17. Nozzles 18 and 19 are provided at the terminal ends of the conduits 15 and 16 and serve to distribute gases from the conduits to a point adjacent the forward portion of the drive wheels W of the vehicle. Preferably, the outermost portions 15' and 16' of each of the conduits is formed of a self-sustaining but bendable or corrugated material which allows the nozzles to be adjusted on initial installation without requiring additional clamps to support the nozzles 18 and 19 in a properly angled position relative to the vehicle drive wheels.

Figure 2:
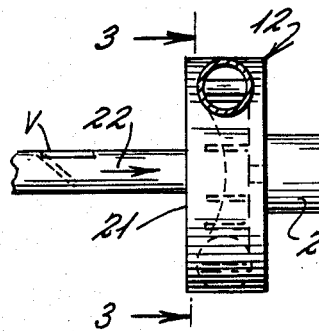
FIG. 2 is an enlarged view of one type of blower unit which may be utilized to insure positive flow of hot gases through the distribution system of the present invention.
Figure 3:
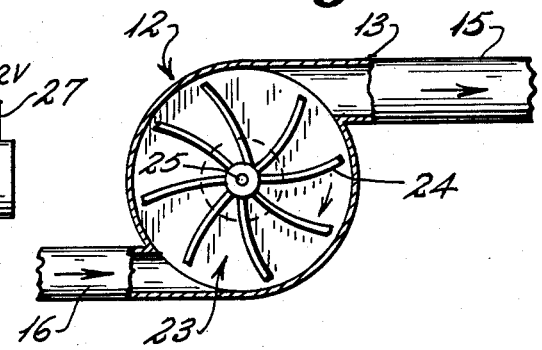
FIG. 3 is a cross sectional view taken through line 2—2 of FIG. 2.

Although any conventional type of fan or blower units may be utilized within the teachings of the present invention, the specific blower shown in FIGS. 2 and 3 of the invention includes an outer housing 20 which includes front and rear generally circular end walls with the front wall having a central opening 21 provided therein through which gases from an inlet line 22 are directed toward the internal radial fan 23 which includes a plurality of fan blades 24 mounted to a rotating drive shaft 25 powered by a motor element 26. The motor is supplied with electrical power from the vehicle's electrical system through electrical contact elements 27.

Figure 4:
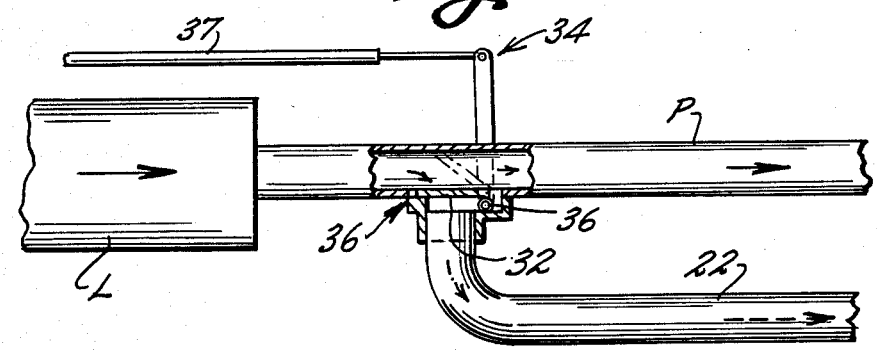
FIG. 4 is an enlarged view having portions broken away of a control valve assembly for the present invention which is connected in line with the vehicle exhaust pipe so as to divert exhaust gases to the blower unit of the present invention when conditions require that gas be supplied to the area adjacent the vehicle drive wheels.

In the basic embodiment of the present invention, exhaust gase passing through the exhaust system may be selectively deflected or reoriented so as to pass to the blower 12 through the blower inlet 22 by operation of the control valve 30 which is mounted in line with the pipe sections P of the exhaust system. The control valve includes a flow diverter flap 32 which is shown in closed position in FIG. 4 in full line wherein the exhaust gases pass directly to the tailpipe through the pipe P of the exhaust system. When it is necessary to divert the exhaust gases to the blower unit 12, the diverter element 32 is raised to the dotted line position as shown in FIG. 4 thereby blocking the passage of gas through pipe P and diverting it into the pipe 22. It should be noted that other types of valving arrangements may be utilized within the spirit of the present invention so long as it is possible to temporarily block off the normal exhaust flow to the tailpipe and reroute the exhaust gases to the blower unit 12. The control valve 30 is further operated by a linkage assembly 34 having a first rocker arm 35 connected at its base with a pivot 36 to which the deflector valve 32 is also secured. The control linkage further includes a cable 37 which extends to a control nob mounted within the vehicle compartment (not shown). As opposed to using a mechanical linkage for operating the control valve 30, a solenoid operated or other electrically operated valve may be utilized so as to control the movement of the deflection plate or valve element 32.

In the operation of the ice and snow melting system of the basic embodiment of the invention, under normal operating conditions, the control valve 30 is closed so that the gas flowing through the exhaust system passes through pipe P and tailpipe T to atmosphere. However, when it is necessary to utilize the exhaust gases to melt ice and snow which is built up in front of the vehicle drive wheels, it is simply necessary for the vehicle operator to actuate the control assembly 34 to open the diverter valve 32 to cause exhaust gases to be directed to the blower element 12. The controls for the present invention are preferably simultaneously operated so that upon movement of lever 35, the motor of the blower 12 will become activated and begin to positively draw the hot exhaust gases into the blower and discharge the same outwardly through pipes 15 and 16. In this manner, the hot exhaust gases will be discharged outwardly through the nozzles 18 and 19 and directed toward the road surface forwardly of the drive wheels W. As shown in FIG. 2 of the drawings, in the event the blower unit were to draw too great an amount of exhaust gas so as to create a negative pressure within the exhaust line in the area of the exhaust manifold of the engine, a separate valve V is provided along line 22 which opens to atmosphere so as to permit atmospheric air to be drawn in so as to increase the air flow to the blower and reduce the back pressure within the exhaust system so that there is no adverse effect on the engine operation.

In the secondary embodiments of the present invention disclosed in FIGS. 5–7, there is no need to provide a safety valve for regulating negative pressure effects along the vehicle exhaust line or system as the supplemental heating elements disclosed in FIGS. 5–7 will automatically provide for a sufficient air flow to offset the development of any negative pressures within the exhaust system.

With particular respect to the embodiment of invention shown in FIG. 5, a catalytic converter C is shown as being surrounded by a heat exchanger housing 40 having upper and lower sections 41 and 42 which are generally semi-cylindrical in shape and which are joined along opposing flanges 43 and 44 by the use of separate fastener elements (not shown) or by being welded with respect to one another. Mounted within the heat exchanger 40 are a plurality of generally equally spaced spiral fins or partitions 45 which extend from the inlet side 46 to the discharge side 47 of the heat exchanger. The fins 45 are of a size to extend from the inner surface of the housing half sections 41 and 42 into substantial contact with the exterior surface of the catalytic converter C. In this way, a plurality of spirally shaped air passageways 48 are created through the heat exchanger. Mounted adjacent the discharge end 47 of the heat exchanger is an outlet header 49 which communicates the spiral passageways 48 with a secondary blower inlet pipe 50 which communicates with the primary inlet pipe 22 as shown in FIG. 6. The heat exchanger 40 also includes a discharge valve 51 which is placed within the outlet header 49 and which serves to close the outlet header so as to direct hot air through conduit 50 and toward the blower 12 when it is desired to direct hot air toward the rear wheels of the automotive vehicle. At other times, the valve will be open as shown in dotted line position so as to permit the hot air to be directed to atmosphere. The valve is controlled by a solenoid 52 which is mounted directly above the outlet header and which is electrically connected through conductor elements 53 and 54 to the motor unit of the blower 12. In this manner, whenever the blower unit motor is activated, the solenoid will activate to close valve element 51 to direct air into the secondary inlet 50.

In the operation of the embodiment of the invention disclosed in FIGS. 5 and 6, hot air may be provided either through the heat exchanger 40 to the blower 12 and subsequently to the area adjacent the drive wheels W of the vehicle or air may be directed simultaneously through the heat exchanger 40 and the exhaust system E through the blower 12 to the drive wheels of the vehicle. When the control valve 30 is in a closed position and the blower motor activated, air will be directed only through the heat exchanger 40. In this manner, ambient air is drawn into the spiral passageways 48 and heated by passing in heat exchange relationship with the exterior housing of the catalytic converter C. Thereafter, the heated air will pass through the secondary inlet 50 and into the intake opening into the blower. If exhaust gases are to be simultaneously applied and directed to the area in front of the vehicle drive wheels, then control valve 30 is opened so as to direct exhaust gases from pipe P into the primary blower inlet pipe 22. In this manner, exhaust gases from pipe 22 are combined with the heated air coming through pipe 50 and are both drawn into the blower unit 12 and discharged through pipes 15 and 16.

With particular reference to FIG. 7 of the drawings, as opposed to drawing air in heat exchange relationship to the catalytic converter, air may be drawn through a heat exchanger 60 which is mounted over the exhaust manifold of the engine. The heat exchanger 60 includes a simple metallic housing which is open adjacent the front end 61 thereof so as to allow for the introduction of air between the housing and the exhaust manifold. Air is preheated when passing adjacent to the manifold within the housing and is conducted by conduit or pipe 62 which extends through a solenoid valve 63 to a T-coupler 64 which joins the pipe 62 with the primary inlet pipe 22. In this embodiment, when the motor 26 of the blower 12 is activated, the solenoid valve will be activated in response to electrical signals received through conductors 65 and 66. The solenoid valve will allow gas to pass therethrough into the T-coupler 64 so as to supply hot gas passing through heat exchanger 60 to the inlet of the blower unit. As with the previous embodiment, if control valve 30 is closed, then no exhaust gases will pass through the blower and the blower unit will only supply air preheated through heat exchanger 60. On the other hand, if control element or valve 30 is operated, then exhaust gases from pipe P will be diverted into the inlet of the blower together with hot air from the heat exchanger 60. In this manner, the amount of hot air supplied adjacent the vehicle drive wheels may be effectively regulated.

With the present invention, it is not only possible to use exhaust gases direct from the exhaust gas system of an automotive vehicle to melt ice and snow adjacent the vehicle drive wheels but it is also possible to combine additional hot air sources from heat exchangers mounted along the length of the exhaust system so as to provide a supplemental source of hot air for melting ice and snow. Further, with the systems of the present invention, a positive flow of increased volume of heated air and gases may be achieved and directed toward the area adjacent the drive wheels so as to increase the melting capacity of the systems without creating adverse back pressures on the vehicle exhaust system. In each of the embodiments, separate mechanical or electrical controls may be provided interiorly of the automotive vehicle to initiate the actuation of the valves and blower of the system. It is also envisioned that in some instances, it may be necessary to provide a secondary blower especially if hot air is to be distributed to four separate drive wheels as opposed to the two wheel system described in the preferred embodiments.

I claim:

1. An apparatus for melting ice and snow which accumulated in the area of an automotive vehicle's drive wheels wherein the automotive vehicle includes an exhaust system having an exhaust pipe comprising, a valve assembly mounted along said exhaust pipe, said valve assembly including an exhaust gas diverter member and an exhaust diversion outlet, a blower means having an inlet and outlet means, a blower inlet conduit communicating said exhaust diversion outlet to said inlet of said blower means, control means for operatively moving said exhaust gas diverter member between a first position wherein said exhaust diversion outlet is closed to prohibit exhaust gas from entering into said blower inlet conduit to a second position wherein said exhaust diversion outlet is open to communication with the exhaust pipe so as to permit exhaust gases to pass into said blower inlet conduit, a pair of discharge conduits communicating with said outlet means of said blower means so as to receive gases discharged therefrom, said discharge conduits having outlet ends which terminate adjacent at least two of the vehicle's drive wheels, motor means operatively connect to drive said blower means so as to positively force exhaust gases toward said outlet ends of said discharge conduits when said exhaust gas diverter member is in said second position, and primary control means remotely spaced from said motor means for selectively energizing said motor means, whereby exhaust gases from the vehicle's engine may be selectively and positively urged towards the areas adjacent the vehicle's drive wheels.

2. The apparatus of claim 1 including a pressure relief valve means mounted intermediate the exhaust pipe and said inlet of said blower means, said relief valve means being open to atmosphere when the gas flow rate from said outlet means of said blower means is greater than the gas flow rate through the exhaust pipe.

3. The apparatus of claim 1 in which the automotive vehicle includes an engine block and the vehicle exhaust system includes an exhaust manifold adjacent the engine block, heat exchange means mounted to the exhaust manifold, said heat exchange means including a housing having an ambient air inlet and exhaust openings, an auxiliary conduit extending from said exhaust opening to said blower inlet conduit and valve means mounted along said auxiliary conduit for selectively opening said auxiliary conduit so as to be in open communication with said blower means by way of said blower inlet conduit.

4. The apparatus of claim including means for electrically connecting said valve means to open said auxiliary conduit in response to the energizing of said motor means.

5. The apparatus of claim 1 in which the exhaust system of the automotive vehicle includes a catalytic converter, a heat exchanger mounted to the catalytic converter and having an ambient air inlet end and a heated air discharge end, a heated air conduit extending from said heated air discharge end to said blower inlet conduit, and valve means selectively movable to a first position opening said heated air discharge end to atmosphere and to a second position wherein said heated air end is in communication with said blower inlet conduit.

6. The apparatus of claim 5 including means for electrically connecting said valve means to said motor means so as to be positioned in said second position when said motor means is energized.

7. The apparatus of claim 5 in which said heat exchanger includes an outer housing which surrounds the catalytic converter and which has a plurality of spiral partition means extending therethrough between said inlet end and said heated air discharge end, and a plurality of heat exchange passageways formed between said partition means.

8. The apparatus of claim 1 in which said outlet ends of said exhaust discharge conduits are bendable so as to be selectively reoriented with respect to the vehicle drive wheels and are self-supporting so as to retain a selected reorientation.

* * * * *